United States Patent Office 2,883,181
Patented Apr. 21, 1959

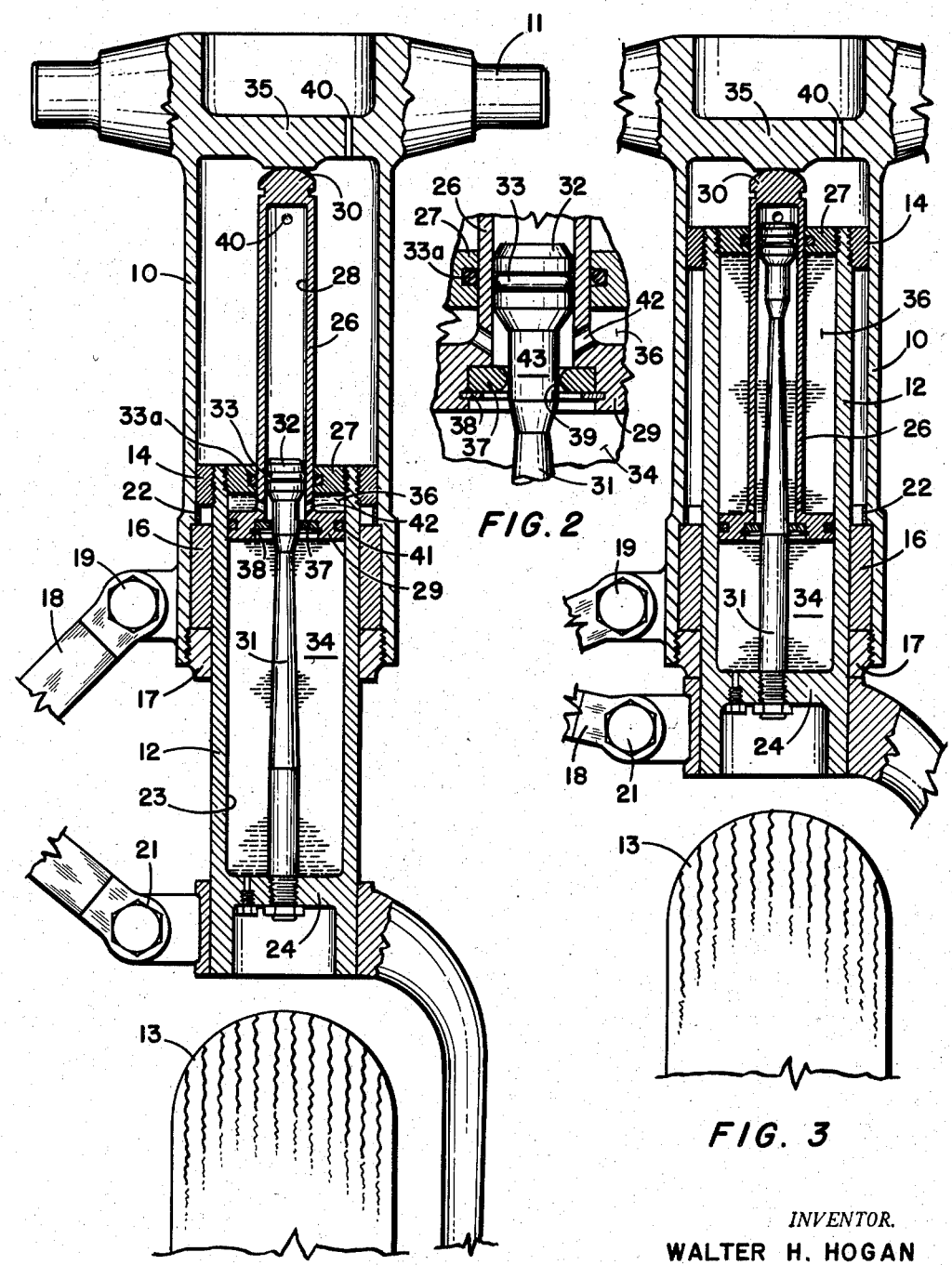

2,883,181

LANDING GEAR CONSTRUCTION

Walter H. Hogan, Olmsted Falls, Ohio, assignor to Cleveland Pneumatic Industries, Inc., Cleveland, Ohio, a corporation of Ohio Application November 14, 1955, Serial No. 546,722

2 Claims. (Cl. 267—64)

This invention relates to liquid springs in general and more particularly to a new and improved liquid spring device particularly suited for use in aircraft landing gears.

An aircraft landing gear must serve two functions, one of which is to absorb the impact of landing and the other is to provide resilient support for the aircraft when it is moved on the ground. An aircraft landing gear according to this invention is particularly desirable since it provides means for serving both of the above named functions while providing a mechanism which is lighter and smaller than comparable conventional landing gears.

It is an important object of this invention to provide a landing gear incorporating a liquid spring equipped with motion damping means particularly suited for absorbing landing impacts and resiliently supporting the aircraft when it is on the ground.

It is another object of this invention to provide a long stroke liquid spring in combination with integral motion damping means.

It is still another object of this invention to provide an aircraft landing gear incorporating a new and improved liquid spring and shock absorbing device.

Further objects and advantages will appear from the following description and drawings, wherein:

Figure 1 is a side elevation in longitudinal section showing a landing gear according to this invention in the fully extended position;

Figure 2 is an enlarged fragmentary longitudinal section of the motion damping means; and Figure 3 is a view similar to Figure 2 showing the position of the elements when the landing gear is fully compressed.

Referring to the drawings, the preferred landing gear is provided with an upper telescoping member 10 formed with trunnions 11 utilized to mount the landing gear on the aircraft. A lower telescoping member 12 is axially movable relative to the upper telescoping member 10, and is provided with a ground engaging wheel 13 journaled on its lower end. A bearing 14 threaded onto the upper end of the lower telescoping member 12 cooperates with a bearing 16 mounted on the upper telescoping member 10 by a gland nut 17, to provide lateral support between the two telescoping members while permitting relative axial motion therebetween. To prevent relative rotation between the two telescoping members, torque arms 18 are pivotally connected between the two telescoping members as at 19 and 21. A spacer sleeve 22 is positioned within the upper telescoping member 10 between the bearings 14 and 16 to limit axial motion of the bearing 14 toward the bearing 16 and thereby limit the extension of the strut.

The lower telescoping member 12 is formed with an axially extending bore 23 terminating in an end wall 24 at its lower end. A plunger tube 26 projects into the upper end of the bore 23 through a gland member 27 which in turn is mounted at the upper end of the lower telescoping member 12. The plunger tube itself is formed with an axial bore 28 extending from its lower end and on its lower end with an outwardly extending flange 29 slidably mounted within the bore 23 of the lower telescoping member 12. The closed upper end 30 of the plunger tube 26 engages a radial wall 35 formed in the upper telescoping member 10 to limit axial motion of the plunger tube in the upward direction. A metering pin 31 is threadedly connected to the end wall 24 at its lower end and is provided with a head portion 32 which projects into the bore 28 of the plunger tube 26. Resilient seals 33 and 33a are provided on the head portion 32 and on the gland member 27 respectively to prevent leakage of fluid from the bore 23 along the plunger tube 26. Thus a cavity is formed with a lower telescoping member 12 which is filled with liquid and divided into a first or lower chamber 34 and a second or upper chamber 36. It should be understood that the cavity which includes both of the chambers 34 and 36 is completely filled with liquid when the landing gear is in the extended position of Figure 1 and is under a precharge pressure at this time. The zone within the plunger tube 26 above the seal 33 and the zone above the lower telescoping member 12 within the upper telescoping member 10 are vented through apertures 40. Preferably the seal 33 on the head portion 32 is radially within the seal 33a on the gland member 27 so that there will be no pressure forces produced on the inside of the plunger tube 26 which are not balanced by fluid pressures on the outside of the plunger tube or vice versa.

To provide for damping to resist movement of the plunger tube 26 relative to the lower telescoping member 12, I mount on the plunger tube adjacent to its lower end an orifice plate 37 by means of a snap ring 38. The orifice plate is formed with a central orifice 39 affording a circular passageway around the metering pin 31 through which fluid can flow from the lower chamber 34 to the upper chamber 36 when the plunger tube moves axially into the lower telescoping member 12. A seal 41 is provided on the flange 29 so that the only fluid communication between the two chambers is through the orifice 39. The plunger tube is formed with a plurality of radial openings 42 adjacent to the orifice plate 37 to provide fluid communication between the chamber 36 and the portion of the bore 28 below the head 32, which portion is to be understood as a part of the chamber 36.

In the operation of this device there are two types of reaction forces that operate on the plunger tube 26 when it moves into the lower telescoping member 12, one of which is determined by the motion of the plunger tube 26 and the other by the amount the plunger tube 26 projects into the liquid filled cavity. When the plunger tube 26 moves toward the lower telescoping member 12, the volume of the lower chamber 34 is decreased and the volume of the upper chamber 36 is increased. Therefore, the liquid pressure in the lower chamber increases rapidly and the liquid pressure in the upper chamber 36 decreases. This difference in pressure produces a reaction force on the flange 29 of the plunger tube which resists movement thereof. The difference in pressure between the two chambers 34 and 36 also causes the liquid in the lower chamber 34 to flow through the orifice 39 into the upper chamber 36. Therefore, the flow of liquid through the orifice attempts to equalize the pressure of the liquid in the two chambers. The difference in pressure between the two chambers 34 and 36 is therefore determined by the relative velocity between the plunger tube 26 and the lower telescoping member 12, the effective area of the flange and the instantaneous effective area of the orifice 39. This reaction force which operates on the flange 29 is in the motion damping force, and the metering pin 31 can be contoured to control its magnitude in any desired way as the plunger tube 26 moves relative to the lower telescoping member.

Preferably the metering pin 31 is formed with a first portion 43 (Figure 2) having a cross section only slightly smaller than the area of the orifice 39 which is positioned within the orifice when the landing gear is in the fully extended position. Therefore, a very high restriction is provided to resist the flow of liquid from the first chamber 34 to the second chamber 36 during the initial landing of the aircraft, that is when the plunger tube initially moves into the lower telescoping member 12. Immediately below the first portion 43, the metering pin is contoured to cooperate with the orifice 39 to provide a varying flow restriction so that the desired load stroke will be achieved in the landing gear.

Once the plunger tube 26 stops moving relative to the lower telescoping member 12, the liquid pressure in the two chambers equalizes and the liquid spring force is the only liquid force effective on the plunger tube 26. It should be understood that movement of flange 29 per se does not produce a difference in the total volume of the two chambers 34 and 36, that is, the volume of the liquid cavity. The total volume of the cavity is therefore only affected by the relative position of the plunger tube 26 and the lower telescoping member 12. If the plunger tube 26 is moved into the lower telescoping member 12, the total volume of the cavity is reduced by an amount equal to the effective cross section of the portion of the plunger tube 12 passing through the seals 33 and 33a times the length of the portion of the plunger tube moving into the lower telescoping member. Thus the total volume of the cavity is determined by the relative position of the plunger tube and the lower telescoping member 12 and is not affected by the relative velocity therebetween. As the plunger tube 26 is moved axially into the lower telescoping member 12, the total volume of the liquid cavity is decreased so that liquid is compressed to a higher pressure. This increases the reaction force of the liquid on the plunger tube so a resilient liquid spring is provided.

Since a very small amount of compression in liquid causes a very large increase in pressure, it is necessary to provide a device wherein the plunger tube has a relatively small cross sectional area if it is desired to achieve a relatively long spring stroke. However, since the plunger tube 26 is subjected to axial loading, the strongest column will be provided, for a given cross sectional area, if a hollow tube configuration is used.

In a normal landing, the upper telescoping member 10 moves axially toward the lower telescoping member 12 and thereby moves the plunger tube 26 into the lower telescoping member 12. The majority of the impact energy is absorbed by the flow of liquid from the lower chamber 34 to the upper chamber 36. However, after the landing impact, the aircraft is resiliently supported by the liquid spring action.

By utilizing a metering pin 31 formed with the enlarged first portion 43, it is possible to cause a rapid loading of the landing gear at impact which causes the tires of the wheel 13 to absorb the initial energy after which the remaining portion of the impact is absorbed by the flow of liquid through the orifice 39 and the compression of the liquid within the lower telescoping member 12.

Since a liquid spring may be small for a given load when compared to pneumatic springs or the like because of the higher operating pressures, a landing gear according to this invention may be lighter and more compact than was previously possible in pneumatic spring type landing gears. Also, since the plunger tube 26 is a hollow column, a relatively long stroke can be achieved without sacrificing the column strength of the plunger tube. Of course the use of a hollow plunger tube makes it possible to incorporate a contoured metering pin so that any given load stroke relationship may be achieved.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. A liquid spring comprising a member formed with an axial bore, a plunger tube projecting into said bore, first seal means fixed relative to said member sealing against the outer surface of said plunger tube, a solid metering pin mounted on said member projecting into said plunger tube, second seal means mounted on said metering pin sealing against the inner surface of said plunger tube, a liquid filled cavity in said member defined in part by said plunger tube the volume of which is changed only by relative motion between said plunger tube and member, an orifice plate mounted on said plunger tube formed with a central orifice through which said metering pin projects, said orifice plate dividing said cavity into two chambers in fluid communication through said orifice, said metering pin being contoured to regulate the resistance to flow of liquid through said orifice.

2. A landing gear adapted to absorb landing impacts comprising upper and lower telescoping members capable of relative axial motion, bearing means between said members preventing lateral motion therebetween, said upper member being adapted to be mounted on an aircraft, a ground engaging element mounted on said lower element, one of said members being formed with an axial bore, a plunger tube with one end projecting into said bore, a seal fixed relative to said one member sealing against the outer surface of said plunger tube, a metering pin fixed on said one member extending into said plunger tube, a seal fixed on said metering pin sealing against the inner surface of said plunger tube, said seals, one member and plunger tube co-operating to define a liquid filled cavity, an orifice plate on said plunger tube formed with an orifice through which said metering pin projects dividing said cavity into two chambers in fluid communication through said orifice, said metering pin being contoured to regulate the resistance to flow through said orifice, the other of said members being formed with a radial surface facing said bore, the other end of said plunger tube engaging said radial surface limiting axial motion of said plunger tube relative to said other member only in a direction away from said one member.

References Cited in the file of this patent

UNITED STATES PATENTS

| 1,655,786 | Guerritore | Jan. 10, 1928 |
| 2,276,466 | Cleveland | Mar. 17, 1942 |
| 2,440,353 | Wallace | Apr. 27, 1948 |
| 2,559,967 | Katz | July 10, 1951 |
| 2,580,825 | Orloff | Jan. 1, 1952 |
| 2,650,820 | Levy | Sept. 1, 1953 |
| 2,732,152 | Neilson et al. | Jan. 24, 1956 |
| 2,805,853 | Mercier | Sept. 10, 1957 |

FOREIGN PATENTS

| 664,972 | Great Britain | Jan. 16, 1952 |